(12) United States Patent
Lin

(10) Patent No.: US 6,614,951 B2
(45) Date of Patent: Sep. 2, 2003

(54) OPTICAL COMPONENT HAVING A FLAT TOP OUTPUT

(75) Inventor: Wenhua Lin, Pasadena, CA (US)

(73) Assignee: Lightcross, Inc.

( * ) Notice: Subject to any disclaimer, the term of this patent is extended or adjusted under 35 U.S.C. 154(b) by 0 days.

(21) Appl. No.: 09/924,398

(22) Filed: Aug. 6, 2001

(65) Prior Publication Data
US 2003/0026520 A1 Feb. 6, 2003

(51) Int. Cl.⁷ .............................. G02B 6/34; G02B 6/26
(52) U.S. Cl. ........................................ 385/15; 385/37
(58) Field of Search .............................. 385/15, 27, 39, 385/37

(56) References Cited

U.S. PATENT DOCUMENTS

| | | | |
|---|---|---|---|
| 4,618,210 A | 10/1986 | Kondo | |
| 4,747,654 A | 5/1988 | Yi-Yan | |
| 4,813,757 A | 3/1989 | Sakano et al. | |
| 4,846,542 A | 7/1989 | Okayama et al. | |
| 5,002,350 A | 3/1991 | Dragone | |
| 5,013,113 A | 5/1991 | Soref | |
| 5,039,993 A | 8/1991 | Dragone | |
| 5,243,672 A | 9/1993 | Dragone | |
| 5,412,744 A | 5/1995 | Dragone | |
| 5,450,511 A | 9/1995 | Dragone | |
| 5,467,418 A | 11/1995 | Dragone | |
| 5,581,643 A | 12/1996 | Wu | |
| 5,633,747 A | * 5/1997 | Nikoonahad | 359/312 |
| 5,706,377 A | 1/1998 | Li | |
| 5,841,931 A | 11/1998 | Foresi et al. | |
| 5,938,811 A | 8/1999 | Greene | |
| 6,023,545 A | * 2/2000 | Eldada et al. | 385/37 |
| 6,108,478 A | 8/2000 | Harpon et al. | |
| 6,118,909 A | 9/2000 | Chen et al. | |
| 6,334,013 B1 | * 12/2001 | Laming et al. | 385/37 |

FOREIGN PATENT DOCUMENTS

| | | |
|---|---|---|
| EP | 0647861 A1 | 4/1995 |
| EP | 0985942 A2 | 3/2000 |
| JP | 63-197923 | 8/1988 |
| JP | 2-179621 | 7/1990 |
| JP | 6-186598 | 7/1994 |

OTHER PUBLICATIONS

Abe, et al., Optical Path Length Trimming Technique using Thin Film Heaters for Silica–Based Waveguides on Si, Electronics Letters, Sep. 12, 1996, vol. 32–No. 19, pp. 1818–1820.

Albert, J., Planar Fresnel Lens Photoimprinted in a Germanium–Doped Silica Optical Waveguide, Optics Letters, May 15, 1995, vol. 20–No. 10, pp. 1136–1138.

Aman, M.C., Calculation of Metal–Clad Ridge–Waveguide (MCRW) Laser Modes by Mode Coupling Technique, Journal of Lightwave Technology, vol. LT–4, No. 6, Jun. 1986, pp. 689–693.

(List continued on next page.)

Primary Examiner—Michael C. Zarroli
(74) Attorney, Agent, or Firm—Law Offices of Travis L. Dodd

(57) ABSTRACT

The optical component includes an array waveguide grating having a plurality of array waveguides. The optical component also includes a light distribution component configured to receive a light signal through an inlet port and distribute the light signal to a plurality of the array waveguides. The optical component further includes an output light distribution component configured to receive the light signal distributed to the array waveguides. The light distribution component is configured such that a light signal received through the inlet port with a non-periodic intensity distribution is received in the output light distribution component with a periodic intensity distribution. The period intensity distribution can have a shape that approximates a sinc function.

24 Claims, 12 Drawing Sheets

OTHER PUBLICATIONS

Amann, M.C. et al, Calculation Of The Effective Refractive–Index Step For The Metal–Cladded–Ridge–Waveguide Laser, Applied Optics, vol. 20, No. 8, Apr. 15, 1981, pp. 1483–1486.

Baba, S. et al., A Novel Integrated–Twin Guide (ITG) Optical Switch with a Bull–in TIR Region; IEEE Photonics Technology Letters, vol. 4, No. 5, May 1992, p. 486–488.

Benson, T.M., Etched–Wall Bent–Guide Structure for Integrated Optics in the III–V Semiconductors; Journal of Lightwave Technology, vol. LT–2, No. 1, Feb. 1984; p. 31–34.

Berry, G.M. et al., Analysis Of Multilayer Semiconductor Rib Waveguides With High Refractive Index Substrates, Electronics Letters, vol. 29, No. 22; Oct. 28, 1993; p. 1941–1942.

Betty, I. et al., A Robust, Low–Crosstalk, InGaAsP/InP Total–Internal–Reflection Switch For Optical Cross–Connect Application.

Burke, S.V., Spectral Index Method Applied to Coupled Rib Waveguides; Electronics Letters, vol. 25, No. 9, Apr. 27, 1989, p. 605–606.

Burns, W.K. et al., Mode Conversion in Planar–Dielectric Separating Waveguides; IEEE Journal of Quantum Electronics, vol. QE–11, No. 1, Jan. 1975; p. 32–39.

Cai, Y. et al., A Novel Three–Guide Optical Coupler Using A Taper–Formed Waveguide; j. Appl. Phys 69(5), Mar. 1991; p. 2810–2814.

Cavailles, J.A. et al., First Digital Optical Switch Based on InP/GaInAsP Double Heterostructure Waveguides; Electronics Letters, vol. 27, No. 9, Apr. 25, 1991, p. 699–700.

Chen, R.T. et al., Design and Manufacturing of WDM Devices; Proceedings of SPIE vol. 3234.

Clemens, et al., Wavelength–Adaptable Optical Phased Array in $SiO_2$–Si, Photonics Technology Letters, Oct. 1995, vol. 7–No. 10, 1040–1041.

Dagli, N. et al., Analysis of Rib Dielectric Waveguides; IEEE Journal of Quantum Electronics, vol. QE–21, No. 4, Apr. 1985, p. 315–321.

Dagli, N. et al., Theoretical and Experimental Study of the Analysis and Modeling of Integrated Optical Components; IEEE Journal of Quantum electronics, vol. 24, No. 11, Nov. 1988; p. 2215–2226.

Deri, R.J., et al., Low–Loss GaAs/AlGaAs Waveguide Phase Modulator Using A W–Shaped Index Profile; Sep. 6, 1988.

Deri, R.J., et al., Low–Loss Multiple Quantum Well GaInAs/InP Optical Waveguides; Feb. 21, 1989.

DeVaux, F. et al., 20Gbit/s Operation of a High–Efficiency InGaAsP/InGaAsP MQW Electroabsorption Modulator With 1.2–V Drive Voltage; IEEE Photonics Technology Letters, vol. 5, No. 11, Nov. 1993, p. 1288–1290.

Doerr, C.R. et al., Chirping Of The Waveguide Grating Router For Free–Spectral–Range Mode Selection In The Multifrequency Laser, IEEE Photonics Technology Letters, Apr. 1996, vol. 8–No. 4, pp. 500–502.

Doerr, C.R. et al., Chromatic Focal lane Displacement in the Parabolic Chirped Waveguide Grating Router, May 1997, vol. 9–No. 5, pp. 625–627.

Dragone, c. Efficient NxN Star Couplers Using Fourier Optics, pp. 479–448, Mar. 1989, vol. 7–No. 3, Journal of Lightwave Technology.

Fischer, et al., Singlemode Optical Switches Based on SOI Waveguides with Large Cross–Section, Electronics Letters, Mar. 3, 1994, vol. 30–No. 5, pp. 406–408.

Fischer, K. et al, Sensor Application Of SiON Integrated Optical Waveguides On Silicon; Elevier Sequoia, 1992; p. 209–213.

Fish, G. et al., Monolithic InP Optical Crossconnects; 4×4 and Beyond, JWB2–1, p. 19–21.

Furuta, H. et al, Novel Optical Waveguide For Integrated Optics, Applied Optics, vol. 13, No. 2, Feb. 1974, p. 322–326.

Gini, E. et al., Low Loss Self–Aligned Optical Waveguide Corner Mirrors in InGaAsP/InP, We P2.22.

Goel, K. et al Design Considerations for Low Switching Voltage Crossing Channel Switches; Journal of Lightwave Technology, vol. 6, No. 6, Jun. 1988; p. 881–886.

Granestrand, P. et al., Integrated Optics 4×4 Switch Matrix with Digital Optical Switches; Electronics Letters, vol. 26, No. 1, Jan. 4, 1990; p. 4–5.

Himeno, A. et al., Loss Managemetn and Analysis of High–Silica Reflection Bending Optical Waveguides, Journal of Lightwave Technology, Jan. 1988, vol. 6–No 1, 41–46.

Hsu, K.Y. et al., Photonics devices and Modules, www.c-c.nctu.edu.tw/<ctr/lee_mti/research_topic/photonic_devices_modules.htm, pp. 1–3.

Huang, T.C. et al., Depletion Edge Translation Waveguide Crossing Optical Switch; IEEE Photonics Technology Letters, vol. 1, No. 7, Jun. 1989, p. 168–179.

Hutcheson, L.D. et al., Comparison of Bending Losses in Integrated Optical Circuits; Optics Letters, vol. 5, No. 6, Jun. 1980, p. 360–362.

Inque, H. et al., Low Loss GaAs Optical Waveguides, Journal of Lightwave Technology, vol. LT–3, No. 6, Dec. 1985; p. 204–209.

Irace, A. et al., Fast Silicon–on–Silicon Router Based on a BMFET Device, Journal of Selected Topics in Quantum Electronics, Jan./Feb. 2000, vol. 6–No. 1, pp. 14–18.

Ito, F. et al., Carrier–Injection–Type Optical Switch In GaAs With A 1.06–1.55 $\mu$m Wavelength Range; Appl. Physics Letters, 54(2) Jan. 9, 1989; p. 134–136.

Jackman, N. et al., Optical Cross Connects for Optical Networking; Bell Labs Technical Journal, Jan.–Mar. 1999; p. 262–281.

Johnston, I.R., et al., Silicon–Based Fabrication Process For Production Of Optical Waveguides, IEE Proc–Optoelectron, vol. 143, No. 1, Feb. 1996, p. 37–40.

Kaenko, A. et al., Athermal Silica–based Arrayedwaveguide Grating (AWG) Multiplexers with New Low Loss Groove Design; TuO1–1, p. 204–206.

Kasahara, R. et al., Low–Power Consumption Silica–based Arrayed–waveguide Grating (AWG) Multiplexers with New Loss Groove Design; TuO1–1, p. 204–206.

Kasahara, R. et al., Low–Power Consumption Slica–Based 2×2 Thermoptic Switch Using Trenched Silicon Substrate, IEEE Photonics Technology Letters, vol. 11, No. 9, Sep. 1999, p. 1132–1134.

Khan, M.N. et al., Fabrication–Tolerant, Low–Loss, and High–Speed Digital Optical Switches in InGaAsP/InP Quantum Wells; Proc $21^{st}$ Eur. Conf.on Opt.Comm.(ECOC '95–Brussels), p. 103–106.

Khan, M.N. et al., High–Speed Operation of Quantum Well Electron Transfer Digital Switches; p. 102–102c.

Kirihara, T. et al., Lossless And Low Crosstalk 4×4 Optical Switch Array; Electronics And Communications in Japan, Part 2, vol. 77, No. 11, 1994, p. 73–81.

Kirihara, T. et al., Lossless and Low–Crosstalk Characteristics in an InP–Based 2×2 Optical Switch, IEEE Photonics Technology Letters, vol. 5, No. 9 Sep. 1993, p. 1059–1061.

Kokubun, Y. et al., Athermal Waveguides for Temperature-Independent Lightwave Devices, Nov. 1993, 1297–1298, vol. 5–No. 11, IEEE Photonics Technology Letters.

Kokubun, Y. et al., Temperature–Independent Narrrowband Optical Filter at 1.3 $\mu$m Wavelength by an Athermal Waveguide, Oct. $10^{th}$, 1996, vol. 32–No. 21, Electronics Letters.

Kokubun, Y. et al., Temperature–Independent Optical Filter at 1.55 $\mu$m Waveguide, Feb. 19, 1998, vol. 34–No. 4, Electronics Letters.

Kokubun, Y. et al., Three–Dimensional Athermal Waveguides for Temperature Independent Lightwave Devices, Jul. $21^{st}$, 1994, vol. 30–No. 15, Electronics Letters.

Kostrzewa, C. et al., Tunable Polymer Guide Add/Drop Filter for Multiwavelength Networks, Photonics Technology Letters, Nov. 1997, vol. 9–No. 11, 1487–1489.

Laakman, K. D. et al., Waveguides: Characteristic Modes Of Hollow Rectangular Dielectric Waveguides; Applied Optics, vol. 15, No. 5, May 1976; p. 1334–1340.

Lee, T.P. et al., $Al_xGa_{1-x}As$ Double–Heterostructure Rib-Waveguide Injection Laser, IEEE Journal of Quantum Electronics, vol. QE–11, No. 7, Jul. 1975; p. 432–435.

Liu, Y.L. et al., Silicon 1×2 Digital Optical Switch Using Plasma Dispersion; Electronics Letters, vol. 30, No. 2, Jan. 20, 1994, p. 130–131.

Mak, G. et al., High–Speed Bulk InGaAsP–InP Electroabsorption Modulators with Bendwidth in Excess of 20 GHz, IEEE Photonics Technology Letter, vol. 2, No. 10, Oct. 1990, p. 730–733.

Marcatili, E., Improved Coupled–Mode Equations for Dielectric Guides; IEEE Journal of Quantum Electronics, vol. QE–22, No. 6, Jun. 1986; p. 988–993.

Marcatili, E.A.J., Bends in Optical Dielectric Guides; The Bell System Technical Journal, Sep. 1969; p. 2103–2132.

Marcatili, E.A.J., Dielectric Rectangular Waveguide and Directional Coupler for Integrated Optics, The Bell System Technical Journal, Sep. 1969 p. 2071–2101.

Marcatili, E.A.J., Slab–Coupled Waveguides; The Bell System Technical Journal, Apr. 1974; American Telephone & Telegraph Company, vol. 53, No. 4, Apr. 1974.

Mirza, A.R. et al, Silicon Wafer Bonding For MEMS Manufacturing, Solid State Technology, Aug. 1999, p. 73–78.

Moerman, I. et al., A Review on Fabrication Technologies for the Monolithic Integration of Tapers with III–V Semiconductor Devices; IEEE Journal of Selected Topics in Quantum electronics, vol. 3, No. 6, Dec. 1997, p. 1308–1320.

Müller, G. et al., First Low InP/GaAsP Optical Switch with Integrated Mode Transformers; ThC12.10; p. 37–40.

Nayyer, J. et al., Analysis of Reflection–Type Optical Switches with Intersecting Waveguides, Journal of Lightwave Technology, vol. 6, No. 6, Jun. 1988; p. 1146–1152.

Negami, t. et al., Guided–Wave Optical Wavelength Demultiplexer Using An Asymmetric Y Junction; Appl. Phys. Lett. 54(12), Mar. 20, 1989; p. 1080–1082.

Nelson, W. et al., Optical Switching Expands Communications–Network Capacity; Laser Focus World, Jun. 1994, p. 517–520.

Nelson, W.H. et al., Wavelength–and Polarization–Independent Large Angle InP/InGaAsP Digital Optical Switches with Extinction Ratios Exceeding 20 dB; IEEE Photonica Technology Letters, vol. 6, No. 11, Nov. 1994; p. 1332–1334.

Noda, Y. et al., High–Speed Electroabsorption Modulator with Strip–Loaded GaInAsP Planar Waveguide; Journal of Lightwave Technology, vol. LT–4, No. 10, Oct. 1986, p. 1445–1453.

Offrein, B.J. et al., Resonant Coupler–Based Tunable Add-After–Drop Filter in Silicon–Oxynitride Technology for WDM Networks, Journal of Selected Topics in Quantum Electronics, vol. 5–No. 5, 1400–1405.

Okamoto, K. et al., Arrayed–Waveguide Grating Multiplexer With Flat Spectral Response; Optics Letters, Jan. 1, 1995; vol. 20, No. 1; p. 43–45.

Okamoto, K. et al., Flat Spectreal Response Arrayed-Waveguide Grating Multiplexer with Parabolic Waveguide Horns, Electronics Letters Online, Jul. 15, 1996, No. 19961120, pp. 1661–1662.

Okamaya, H. et al., 8×8 $Ti:LiNbO_3$ Waveguide Digital Switch Matrix; IEICE Trans. Commun.; vol. E77–B, No. 2; Feb. 1944; p. 204–208.

Okayama, H. et al., Dynamic Wavelength Selective Add/Drop Node Comprising Tunable Gratings, Electronics Letters Online, Apr. 10, 1997, No. 19971607.

Okayama, H. et al., Reduction of Voltage–Length Product for Y–Branch Digital Optical Switch, Journal of Lightwave Technology, vol. 11, No. 2, Feb. 1993; p. 379–387.

Okuno, M. et al., Strictly Nonblocking 16×16 Matrix Switch Using Silica Based Planar Lightwave Circuits, vol. 10, No. 266, Sep. 11, 1986.

Ooba, N. et al., Athermal Silica–Based Arrayed–Waveguide Grating Multiplexer Using Bimetal Plate Temperature Compensator, Electronics Letters, Oct. $12^{th}$, 2000, vol. 36, No. 21, pp. 1800–1801.

Renaud, M. et al., Compact Digital Optical Switches for Low Insertion Loss Large Switch Arrays on InP; Proc. $21^{st}$ Eur.Conf.on Opt. Comm. (ECOC '95–Brussels), p. 99–102.

Rickman, A.G. et al., Silicon–on–Insulator Optical Rib Waveguide Loss and Mode Characteristics, Journal of Lightwave Technology, Oct. 1994, vol. 12–No. 10, pp. 1771–1776.

Rolland, C. et al., 10 Gbit/s, 1–56 βm, Multiquantum Well InP/InGaAsP Mach–Zehnder Optical Modulator, Electronics Letters, Mar. 4, 1993, vol. 29, No. 5, p. 471–472.

Santec Sales Brochure for year 2000 entitled "Optical Components".

Schauwecker, B. et al, Small–Size Silicon–Oxynitride AWG Demultiplexer Operating Around 725 nm, IEEE Photonics Technology Letters, vol. 12 No. 12, Dec. 2000.

Schlachetzki, A. Monolithic IO–Technology–Modulators and Switches Based on InP; SPIE vol. 651 Integrated Optical Circuit Engineering III (1986), p. 60–86.

Silberberg, Y. et al., Digital Optical Switch; Appl. Phys. Lett.; vol. 51, No. 16, Oct. 19, 1987, p. 152–154.

Smit, M.K., New Focusing and Dispersive Planar Component Based on an Optical Phased Array; Electronics Letters; Mar. 31, 1988; vol. 24, No. 7; p. 385–386.

Smith, S.D. et al., CW Operation of Corner Cavity Semiconductor Lasers; IEEE Photonics Technology Letters, vol. 5, No. 8, Aug. 1993; p. 876–879.

Sneh, A. et al., Compact Low Crosstalk and Low Propagation Loss Quantum–Well Y–Branch Switches; PDP 4–1—4–5.

Soole, J.B.D. et al., Use of Multimode Interference Couplers to Broaden the Passband of Wavelength–Dispersive Integrated WDM Filters; IEEE Photonics Technology Letters, vol. 8, No. 10, Oct. 1996; p. 1340–1342.

Stoll, L. et al., 1:8 Optical Matrix Switch on InP/InGaAsP; TuB7.2; p. 337–340.

Stutus, W. et al, Silicon Nitride Films On Silicon For Optical Waveguides, Applied Optics, vol. 16, No. 12, Dec. 1977, p. 303–307.

Sugie, T. et al., 1.3–$\mu$m Laser Diodes with a Butt–jointed Selectively Grown Spot–Size Converter; ThB2–6, IOOC95, p. 52–53.

Tada, K. et al., Bipolar Transistor Carrier–Injected Optical Modulator/Switch: Proposal and Analysis, IEEE Electron Device Letters, vol. EDL–7, No. 11, Nov. 1986, p. 605–606.

Takada, et al., Optical Spectrum analyzer using Cascaded AWG's with Different Channel Spacings, Photonics Technology Letters, Jul. 1999, vol. 11, No. 7, pp. 863–864.

Takahashi, H. et al., Arrayed Waveguide Gratings for Wavelength Division Multi/Demultilexer with Nanometre Resolution, PWG–NTT–7.

Takaguchi, K. et al., Dispersion Compensation Using a Planar Lightwave Circuit Optical Equalizer, Photonics Technology Letters, Apr. 1994, vol. 6, No. 4, pp. 561–564.

Tien, P.K. et al., Formation of Light–Guiding Interconnections in an Integrated Optical Circuit by Composite Tapered-Film Coupling; Applied Optics, vol. 12, No. 8, Aug. 1973; p. 1909–1916.

Toyoda et al., Thermoplastic Switch and Wavelength Tunable Filter using Polymer Waveguides, Abstract of paper presented at Opticomm 2001 on Aug. 22, 2001.

Treyz, G.V. et al., Silicon Optical Modulators at 1.3 $\mu$m Based on Free–Carrier Absorption; IEEE Electron Device Letters, vol. 12, No. 6, Jun. 1991; p. 276–278.

Tsuda, H. et al., Performance Analysis of a Dispersion Compensator Using Arrayed–Waveguide Gratings, Journal of Lightwave Technology, Aug. 2000, vol. 18–No. 8, pp. 1139–1147.

Tsude, H. et al., Second–and Third–Order Dispersion Compensator Using a High–Resolution Arrayed Waveguide Grating, IEEE Photonics Technology Letters, May 1999, vol. 11–No. 5, 569–571.

Vinchant et al, InP 4×4 Digital–Optical–Switch Module For Multiwavelength Cross–Connect Applications; OFC '95 Technical Digest, Thursday ThK2, p. 281–282.

Vinchant, J.F. et al., First Polarisation Insensitive 4×4 Switch matrix on InP with Digital Optical Switches, TuB7.3, p. 341–344.

Vinchant, J.F. et al., InP Digital Optical Swithch: Key Element for Guided–Wave Photonic Switching; IEE Proceedings–J, vol. 140, No. 5, Oct. 1993; p. 301–307.

Vinchant, J.F. et al., Low Driving Voltage or Current Digital Optical Switch on InP for Multiwavelength System Applications; Electronics Letters, vol. 28, No. 12, Jun. 4, 1992; p. 1135–1137.

Wakita, K. et al., Long Wavelength Waveguide Multiple Quantum Well Optical Modulators; IEEE Journal of Quantum Electronics, vol. QE–23, No. 12, Dec. 1987, p. 2210–2215.

Wanru, Z. et al., Total Internal Reflection Optical Switch with Injection Region Isolated by Oxygen Ion Implantation; p. 1–10.

Yamada, et al., Cross Talk Reduction in a 10 GHz Spacing Arrayed–Waveguide Grating by Phase–Error Compensation, Journal of Lightwave Technology, Mar. 1998, vol. 16–No. 3, pp. 364–371.

Yanagawa, H. et al., Polarization–and Wavelength–Insensitive Guided–Wave Optical Switch with Semiconductor Y Junction; Journal of Lightwave Technology; vol. 8, Aug. 1990, p. 1192–1197.

Yu, S. et al., High Speed All–Optical Packet Routing Using A Vertical Coupler Crosspoint Space Switch.

Yu, S. et al., Ultralow Cross–Talk, compact integrated optical crosspoint space switch arrays employing active InGaAsP/InP Vertical Waveguide Couplers, Integrated Optical Crosspoint Switch Arrays, Siyuan Yu e t a, CPD24–2.

Zengerle, R. et al., Tapered Twin Waveguides For Spot–Size Transformation In InP; TheB2–5; IOOC '95; p. 50–51.

Zirngibl, M. et al., Digitally Tunable Laser Based On The Integration Of A Waveguide Grating Multiplexer And An Optical Amplifier, IEEE Photonics Technology Letters, Apr. 1994, vol. 6–No. 4, pp. 516–517.

Zucker, J.E. et al., Strained Quantum Wells for Polarization-Independent Electrooptic Waveguide Switches, Journal of Lightwave Technology, vol. 10, No. 12, Dec. 1992, p. 1926–1930.

* cited by examiner

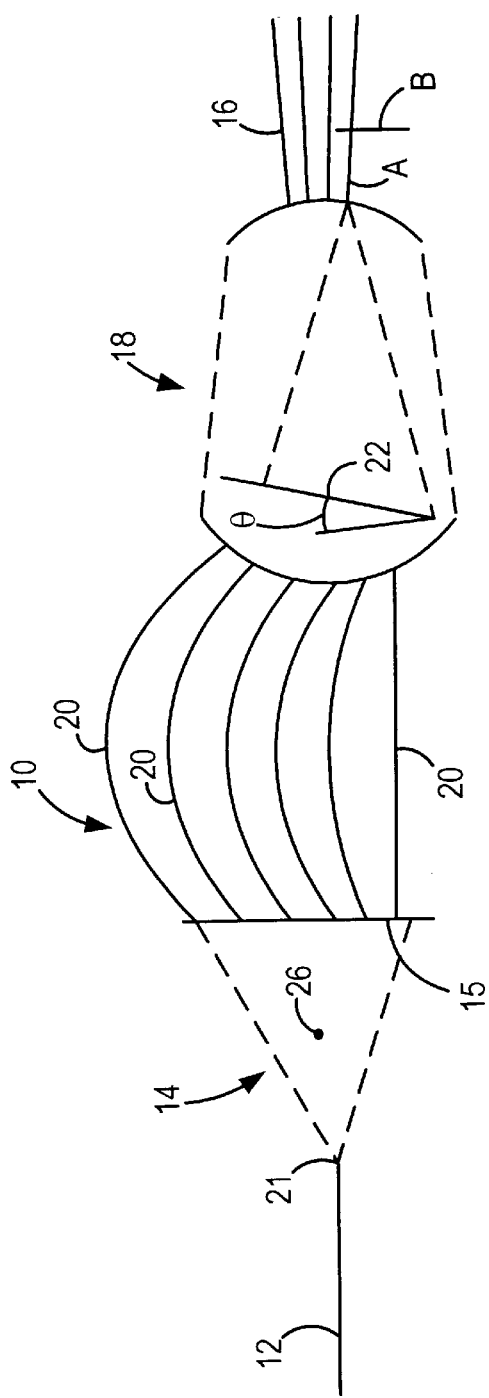
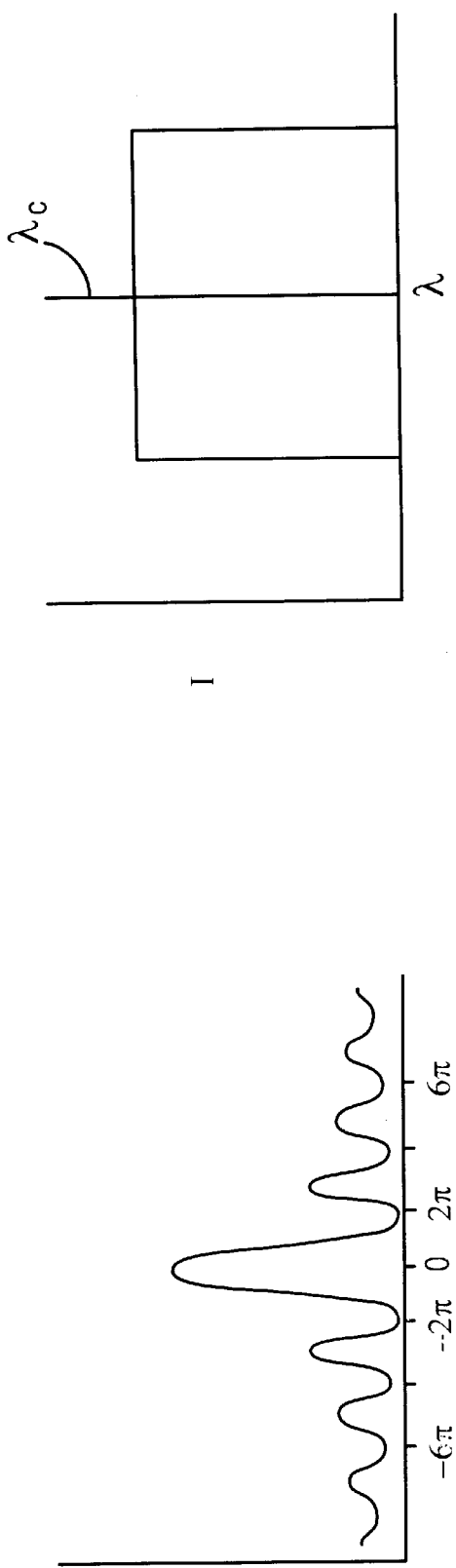
Figure 1A
Figure 1B
Figure 1C

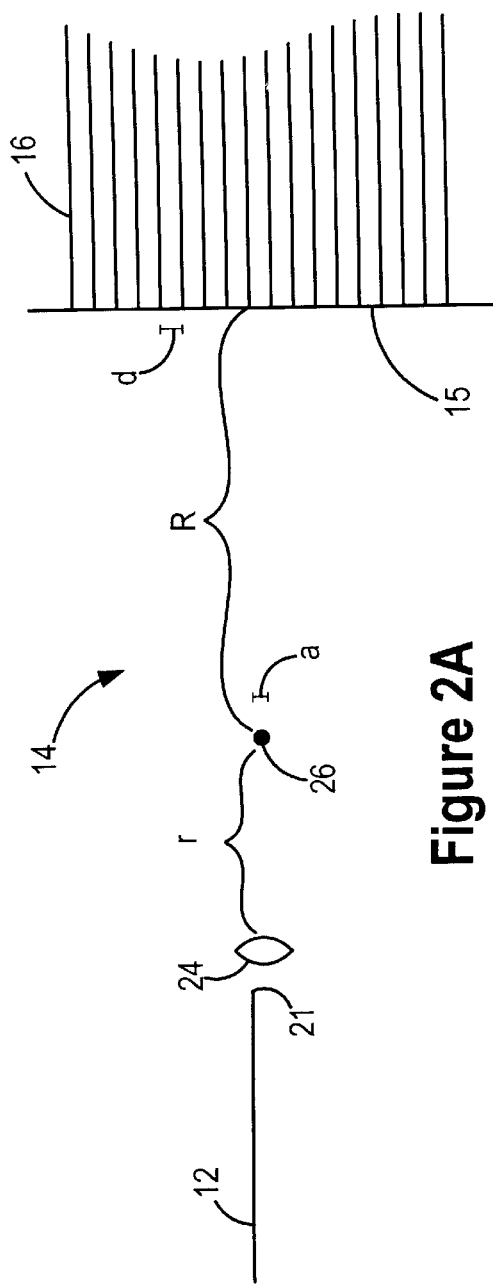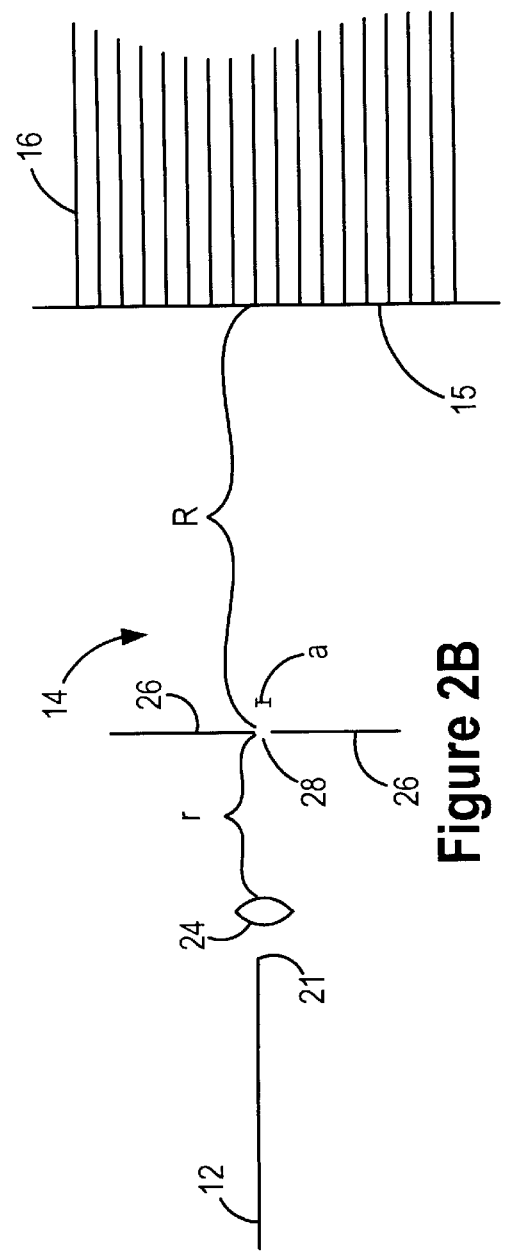

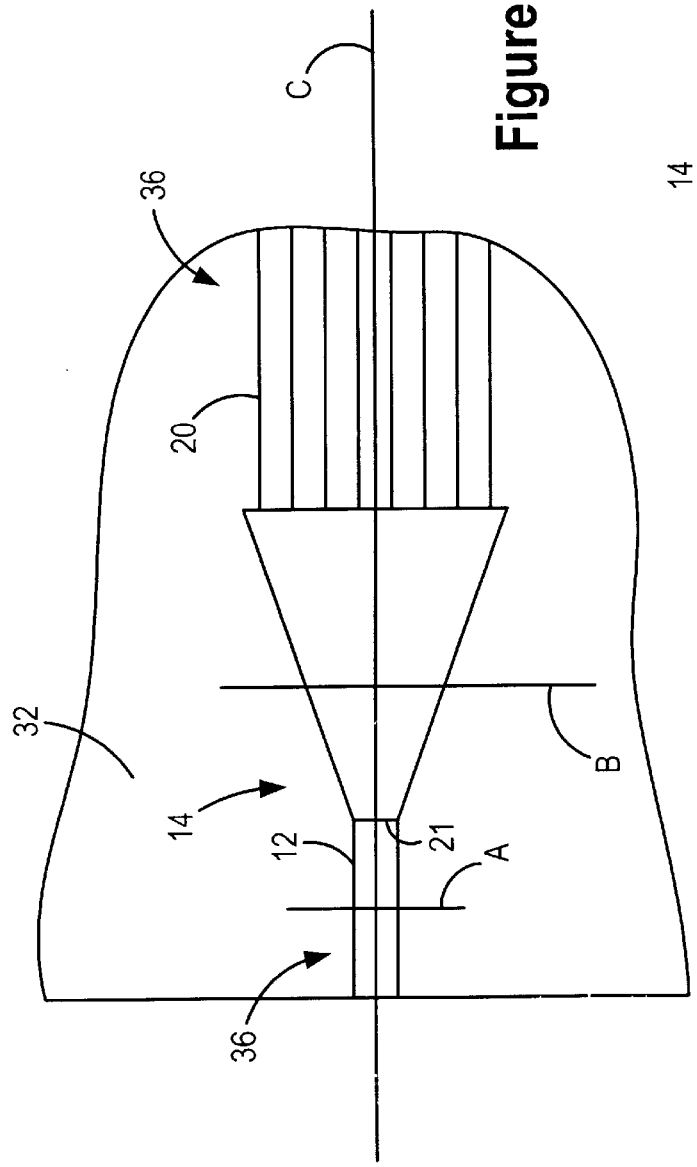

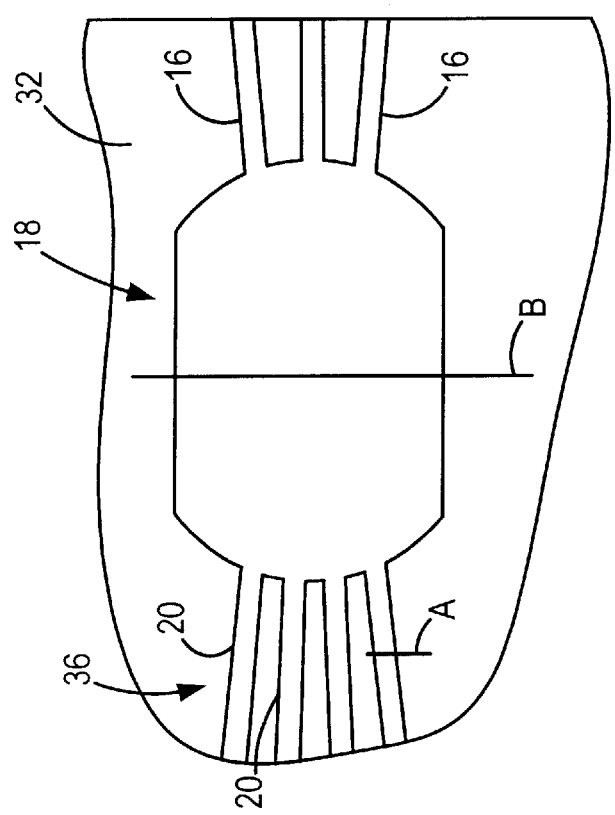
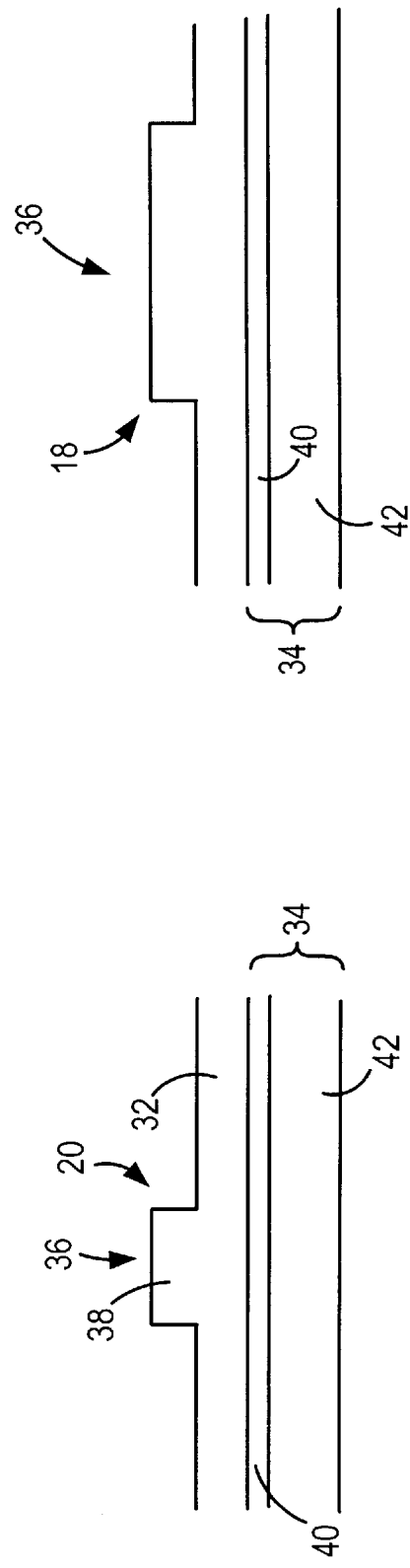

OPTICAL COMPONENT HAVING A FLAT TOP OUTPUT

BACKGROUND

1. Field of the Invention

The invention relates to one or more optical networking components. In particular, the invention relates to optical components having a flat top output.

2. Background of the Invention

The wavelength division multiplexing technique allows a waveguide to carry more than one channel of information in a multichannel beam of light. Each channel is carried on a light signal having a unique wavelength.

A demultiplexer is typically employed to separate the channels in a multichannel beam. Separating the channels allows the channels to be independently processed. The demultiplexer receives the multichannel beam on an input waveguide and outputs each of the channels on a different output waveguide. Accordingly, each output waveguide is typically associated with a particular channel.

The intensity versus wavelength profile of the light in each output waveguide typically peaks at the wavelength associated with a particular channel. However, the wavelengths of light that appears on a particular output waveguide can shift. For instance, temperature changes can affect the index of refraction of materials in the demultiplexer. This change in the index of refraction can cause the wavelengths of light that appear on an output waveguide to shift. This shift can cause the intensity distribution seen on a particular output waveguide to shift away from the peak in the intensity versus wavelength profile. As a result, these shifts can cause a drop in the intensity of the signal in a particular output channel. This drop in the intensity is a source of optical loss in the optical network.

For the above reasons, there is a need for a demultiplexer that is not associated with optical losses that result from a shift in the wavelengths of light that are provided on a particular output waveguide.

SUMMARY OF THE INVENTION

The invention relates to an optical component. The optical component is configured to receive a light signal through an inlet port and distribute the light signal across an output side. The light distribution component is configured such that a light signal received through the inlet port with a non-periodic intensity distribution is distributed across the output side with a periodic intensity distribution. The periodic intensity distribution function can substantially approximate a sinc function. In some instances, the light distribution component is defined in a light transmitting medium positioned on a base.

The optical component can include a plurality of array waveguides configured to receive the light signal distributed across the output side of the light distribution component. The optical component can also include an input waveguide connected to the inlet port.

Another embodiment of the optical component includes a plurality of array waveguides defined a light transmitting medium positioned on a base, the array waveguides being defined such that each array waveguides has an inlet port. The optical component also includes a light distribution component defined in the light transmitting. The light distribution component is configured to receive a light signal through an inlet port and to distribute the light signal to the inlet ports of the array waveguides. The light distribution component is also configured such that a light signal received through the inlet port with a non-periodic intensity distribution is distributed to inlet ports of the array waveguides with a periodic intensity distribution.

Another embodiment of the optical component includes an array waveguide grating having a plurality of array waveguides. The optical component also includes an light distribution component configured to receive a light signal through an inlet port and distribute the light signal to a plurality of the array waveguides. The optical component further includes an output light distribution component configured to receive the light signal distributed to the array waveguides. The light distribution component is configured such that a light signal received through the inlet port with a non-periodic intensity distribution is received in the output light distribution component with a periodic intensity distribution. The period intensity distribution can have a shape that approximates a sinc function.

In some instances, the output light distribution component is configured to focus the received light signal on one or more output waveguides.

The optical component can include a light signal carrying region extending through the light distribution component. One or more obstructions are positioned in the light signal carrying region. The one or more obstructions are configured to obstruct a portion of the light signal traveling through the light signal carrying region. The one or more obstructions can include one or more columns extending through the light signal carrying region. In some instances, one or more columns are each a column of air. The one or more obstructions can define an opening through which the light signal can travel.

The optical component can include a collimator for collimating the light signal. The collimator can be positioned between the collimator and the inlet port. In some instances, the collimator is included in an input waveguide that ends at the inlet port.

The invention also relates to a method of operating an optical component. The method includes receiving a light signal through an inlet port of a light distribution component and distributing the light signal across an output side of the light distribution component such that the light signal. The method also includes diffracting the light signal such that the light signal is distributed across the output side with a substantially sinc shaped intensity distribution. The light distribution component can be defined in a light transmitting medium positioned on a base.

BRIEF DESCRIPTION OF THE FIGURES

FIG. 1A is a schematic diagram of an optical component according to the present invention. The optical component includes a light distribution component connected to a plurality of array waveguides. The light distribution component is configured to generate a light signal with a sinc shaped intensity distribution.

FIG. 1B illustrates the intensity distribution of the light signal at the inlet ports of the array waveguides.

FIG. 1C illustrates the intensity versus wavelength profile of a light signal output by the optical component.

FIG. 2A illustrates operation of a light distribution component configured to produce a light signal with a sinc shaped intensity distribution. The optical component includes an obstruction configured to diffract a light signal.

FIG. 2B illustrates a light distribution component having a plurality of obstructions configured to diffract a light signal. The obstructions define an opening through which light signals travel.

FIG. 3B is a topview of the optical component shown in FIG. 3A.

FIG. 3C is a cross section of the component in FIG. 3B taken at the line labeled A.

FIG. 3D is a cross section of the component in FIG. 3B taken at the line labeled B.

FIG. 5A is a topview of a light distribution component for use in an optical component according to the present invention.

FIG. 5B is a cross section of the component shown in FIG. 5A taken at the line labeled A.

FIG. 5C is a cross section of the component shown in FIG. 5A taken at the line labeled B.

DETAILED DESCRIPTION OF THE PREFERRED EMBODIMENT

Figure 2C:
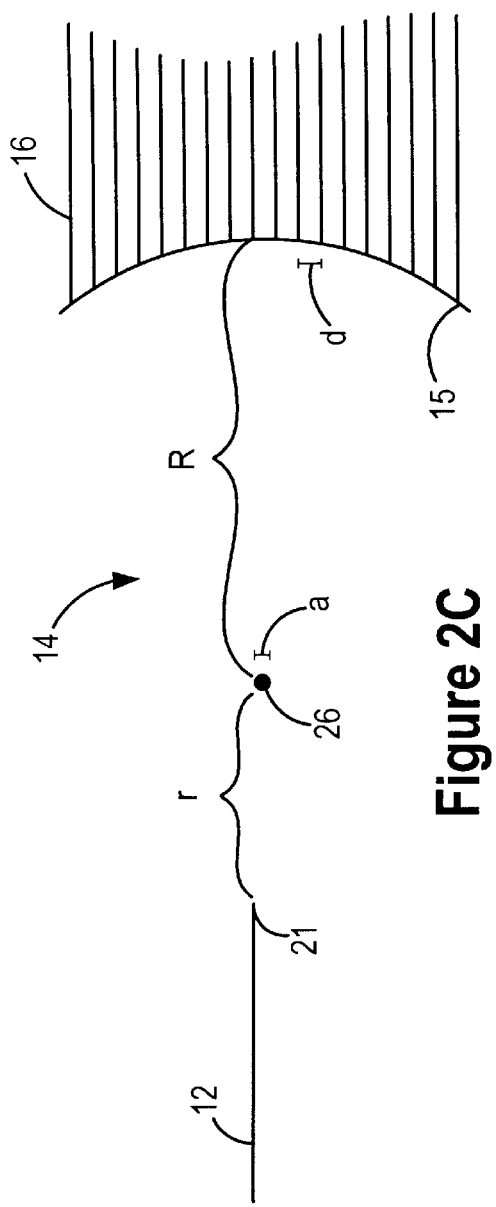
FIG. 2C illustrates operation of another embodiment of a light distribution component configured to produce a light signal with a sinc shaped intensity distribution.

The present invention relates to an optical component having an array waveguide grating and being configured to output light signals on one or more output waveguides. The optical component is constructed so the light signals on the output waveguides have a flat top intensity versus wavelength profile. Because the signals have a flat top shape, a shift in the wavelengths of light that are carried by a particular output waveguide do not result in a drop in the intensity of light carried in the output waveguide. In some instances, the optical component is a demultiplexer. Accordingly, the optical component can be a demultiplexer associated with a reduced degree of optical loss resulting from shifts in the wavelengths carried on a particular output waveguide.

FIG. 1A illustrates an embodiment of the optical component 10. The optical component 10 includes at least one input waveguide 12 in optical communication with an input light distribution component 14 having an output side 15. Although the output side 15 is shown as being straight, the output side can have other shapes such as circular or the shape associated with the output side of star couplers and Rowland circles. The optical component also includes a plurality of output waveguides 16 in optical communication with a output light distribution component 18. A suitable output light distribution component 18 includes, but is not limited to, star couplers and Rowland circles.

The input light distribution component 14 and the output light distribution component 18 are connected by an array of array waveguides 20. The array waveguide grating can be configured so as to provide the optical component with a variety of functions including, but not limited to, demultiplexing, multiplexing, filtration and/or dispersion compensation. For the purposes of describing the optical component, configuration of the array waveguide grating so as to provide a demultiplexing function is considered.

When the optical component is operated as a demultiplexer, adjacent waveguides in the array have a different effective length. The effective length differential between adjacent waveguides is a constant, $\Delta L$. Although six array waveguides 20 are illustrated, the optical component 10 can include many more than six array waveguides 20 or as few as two. Increasing the number of array waveguides 20 can increase the degree of resolution provided by the array.

A single channel light signal is considered for the purposes of simplifying the discussion of operation of the optical component 10. The single channel light signal enters the input light distribution component 14 from the input waveguide 12 through an inlet port 21. The input light distribution component 14 distributes the light signal across the array waveguides 20. The light travels through the array waveguides 20 and enters the output light distribution component 18. Light traveling through a long array waveguide 20 will take longer to enter the output light distribution component 18 than light traveling through a short array waveguide 20. Unless the length differential, $\Delta L$, between adjacent waveguides is a multiple of the light wavelength, light traveling through a long array waveguide 20 enters the output light distribution component 18 in a different phase than the light traveling along the shorter array waveguide 20.

The light entering the output light distribution component 18 from each of the array waveguides 20 recombines to form a new wavefront 22. Because the waveguide array causes a phase differential between the light entering the output light distribution component 18 from adjacent array waveguides 20, the new wavefront 22 is diffracted at an angle labeled, $\theta$. The output light distribution component 18 focuses the new wavefront 22 on a particular output waveguide 16. The output waveguide 16 on which the light signal is focused is a function of the diffraction angle, $\theta$. As illustrated in FIG. 1A, the phase differential causes the light entering the output light distribution component 18 to be focused at the output waveguide 16 labeled A.

Because $\Delta\lambda$ is a different percentage of the wavelength, the amount of the phase differential is different for different channels. As a result, different channels are diffracted at different angles and are accordingly focused on different output waveguides 16. Hence, when a multichannel beam enters the output light distribution component 18, each of the different channels is focused on a different output waveguide 16.

The input light distribution component 14 is configured such that a light signal from the input waveguide is distributed on the output side 15 such that the light signal has an intensity distribution that approximates a sinc function. FIG. 1B illustrates the intensity distribution of the light signal at the output side 15. Simulations show that when a light signal enters the output light distribution component 18 with an sinc shaped intensity distribution, the intensity versus wavelength profile that appears on the output waveguides 16 has a substantially flat top or is substantially square. FIG. 1C illustrates the intensity versus wavelength profile of the light signal taken at the line labeled B in FIG. 1A.

FIG. 2A illustrates operation of an embodiment of an input light distribution component 14 configured to distribute a light signal across the waveguide array with a substantially sinc shaped intensity distribution. The input light distribution component 14 includes a collimator 24 configured to collimate light signals from the input waveguide 12. A suitable collimator 24 includes, but is not limited to, a lens or lens assembly.

An obstruction 26 is positioned so a portion of the collimated light signal is incident on the obstruction 26. The obstruction 26 is configured to diffract a light signal as the light signal travels from the input waveguide to the output side 15. Because the light signal is collimated, the input waveguide 12 can be approximated as being infinitely far from the obstruction 26. As a result, the diffracted light signal has a substantially planar wavefront. Accordingly, the output side 15 of the input light distribution component 14 can have a planar, or straight, contour to match the wavefront.

The input light distribution component can include more than one obstruction 26 configured to diffract the light signal. For instance, FIG. 2B illustrates an input light distribution component 14 having two obstructions 26 arranged such that an opening 28 is formed between the obstructions 26. The opening 28 can be sized so as to cause diffraction of the light signal as is normally associated with slit based diffraction or aperture based diffraction.

The one or more obstructions 26 can diffract the light signal such that the light signal has a sinc shaped intensity distribution at the output side 15 of the input light distribution component 14. For instance, the one or more obstructions 26 diffract the light signal such that the light signal has a sinc shaped intensity distribution at the output side 15 of the input light distribution component 14 when the width of the obstruction 26 or the width of the opening, a, is selected such that $a*n/\lambda > 1$ where $\lambda$ is the wavelength of the light signal in a vacuum and n is the effective index of refraction of the input light distribution component 14.

FIG. 2C illustrates operation of another embodiment of an input light distribution component 14. The input light distribution component does not include a collimator positioned between the input waveguide and the obstruction 26. Accordingly, the diffraction caused by the obstruction 26 approximates Fresnel diffraction. Accordingly, the wavefront of the diffracted light signal is more curved than in the embodiment shown in FIG. 2A. Hence, the output side 15 of the input light distribution component as a shape that matches the curve of the diffracted light signal. In some instances, the output side has the same curve as a traditional star coupler or Rowland circle.

The one or more obstructions 26 diffract the light signal such that the light signal has a sinc shaped intensity distribution at the output side 15 of the input light distribution component 14. Further, the central peak of the sinc function can be centered along a line through the output port of the input waveguide and the obstruction 26 when the input light distribution component is designed such that $a*n/\lambda > 1$, $R \gg a$, $r \gg a$, $R \gg \lambda$ and $r \gg \lambda$, where: r is the distance from the inlet port 21 of the input light distribution component to the obstruction 26 or the opening; R is the distance from the obstruction or opening 28 to the output side along a line defined by the inlet port 21 of the input light distribution component 14 and the obstruction 26 or opening 28.

Figure 2D:
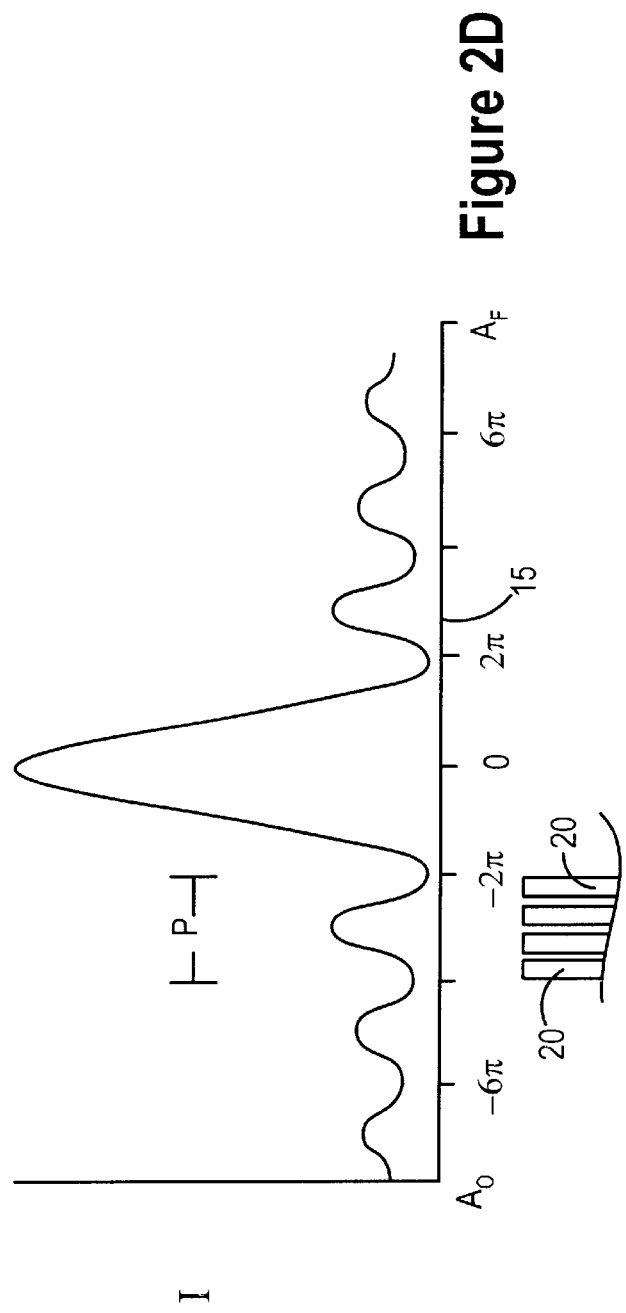
FIG. 2D illustrates the intensity distribution of the light signal at an output side of the light distribution component. The arrangement of the array waveguides relative to the light signal is also illustrated.

As noted above, the diffraction caused by the obstruction 26 causes the light signal to have a sinc shaped intensity distribution at the output side 15 of the input light distribution component 14. FIG. 2D illustrates the intensity distribution of the light signal at the output side of the input light distribution component. The range labeled P illustrates the period of the sinc function. The central peak of the since function is positioned over two periods of the sinc function while the other peaks each occur over a single period.

One or more array waveguides 20 are positioned to receive the light within a period of the sinc function. For instance, FIG. 2D illustrates four array waveguides 20 positioned to receive the light signal within a period of the since function. In the embodiment of FIG. 2A and FIG. 2B, The input light distribution component 14 can be designed such that on the order of $\lambda R/(nad)$ array waveguides are positioned to receive the portion of the light signal associated with a single period of the sinc function where d is the grating pitch. In some instances, there are more than two array waveguides 20, more than three array waveguides 20, or more than four array waveguides 20 positioned to receive the light signal within a period of the since function. Additionally, the number of waveguides that receive the light signal in a period can change. For instance, there can be an increased number of array waveguides 20 per period near the center of the sinc function in order to achieve higher resolution of the light signal near the center of the sinc function. Alternatively, the number of array waveguides 20 per period can increase away from the near the center of the sinc function in order to achieve higher resolution of the light signal away from the center of the sinc function The input light distribution component 14 has a length sufficient for a desired number of sinc function periods to be distributed across the entry ports of the array waveguides 20. In some instances, the input light distribution component is configured such that there are 3 or more, 5 or more, 7 or more or 9 or more sinc function periods distributed across the entry ports of the array waveguides 20. Increasing the number of sinc function periods across the inlet ports of the array waveguides can increase the portion of the diffracted light power that is received by the array waveguide grating.

The obstruction 26 can have a cross sectional shape of a square, rectangle, a circle, an ellipse or another shape. The obstruction 26 or opening 28 preferably has a width, a, of at most about $\pi/2$ times smaller than the light signal width at the point where the light signal intersects the obstruction 26. In some instances, the width of the light signal at the one or more obstructions 26 is about the width of the fundamental mode of the input waveguide and the obstruction 26 or the opening 28 has a width, a, that is smaller than the fundamental mode of the input waveguide. Although FIG. 2A illustrates a single obstruction 26 configured to cause diffraction, the input light distribution component 14 can include a plurality of obstructions 26 configured to cause diffraction. Additionally, the input light distribution component 14 can include a plurality of obstructions 26 configured to define a plurality of openings.

The obstruction 26 can be constructed from a material that is different than the remainder of the input light distribution component 14. Additionally, the obstruction 26 can be constructed from a material with a different index of refraction than the remainder of the input light distribution component 14. When the obstruction 26 has a lower index of refraction than the input light distribution component 14, the obstruction 26 causes reflection of the light signals. In some instances, the obstruction 26 is air while the remainder of input light distribution component 14 is constructed from silicon or silica. In other instances, the obstruction 26 is silicon while the remainder of the input light distribution component 14 is constructed from air or silica.

Figure 3A:
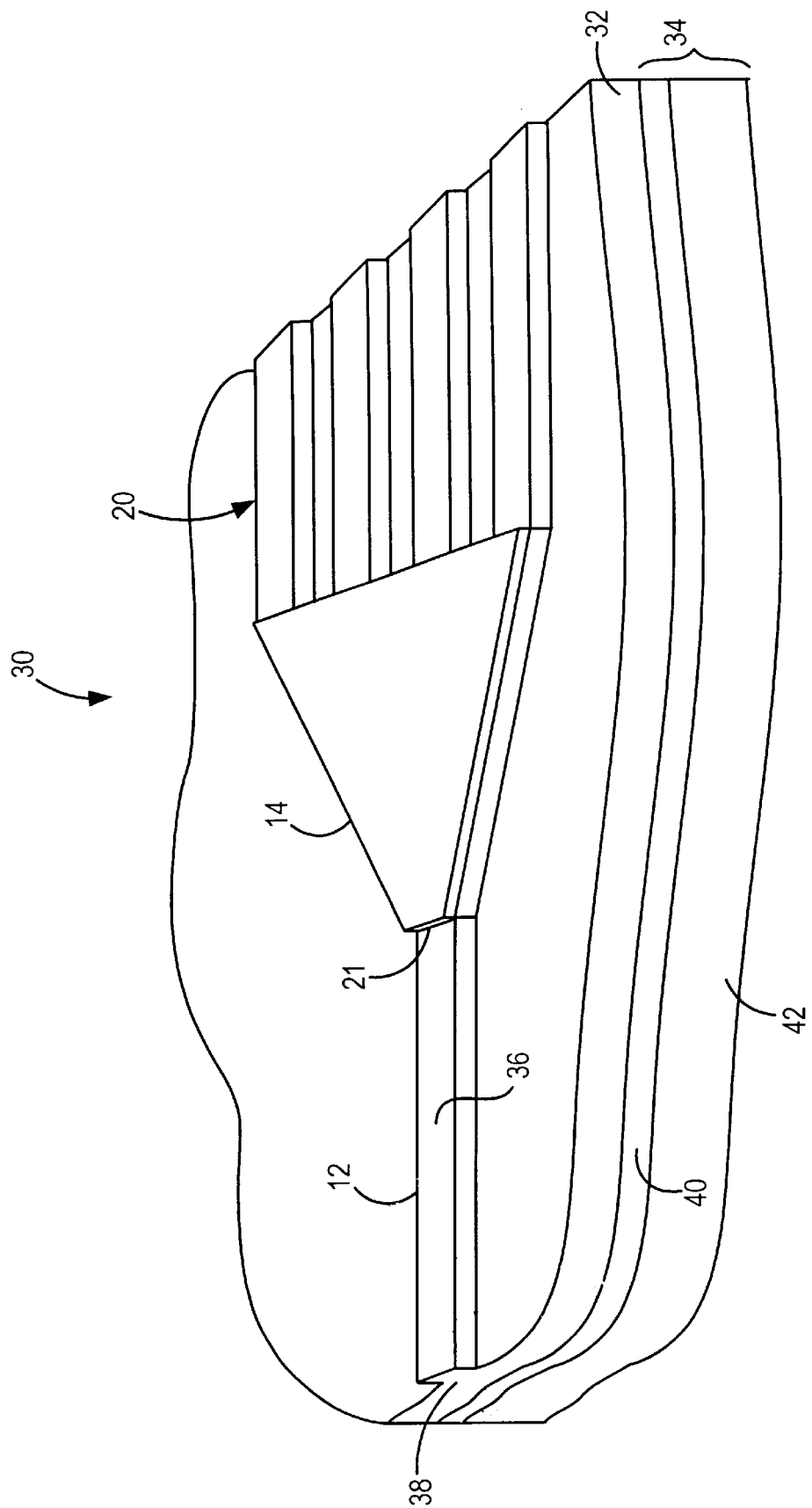
FIG. 3A is a perspective view of a portion of an optical component.
Figure 3E:
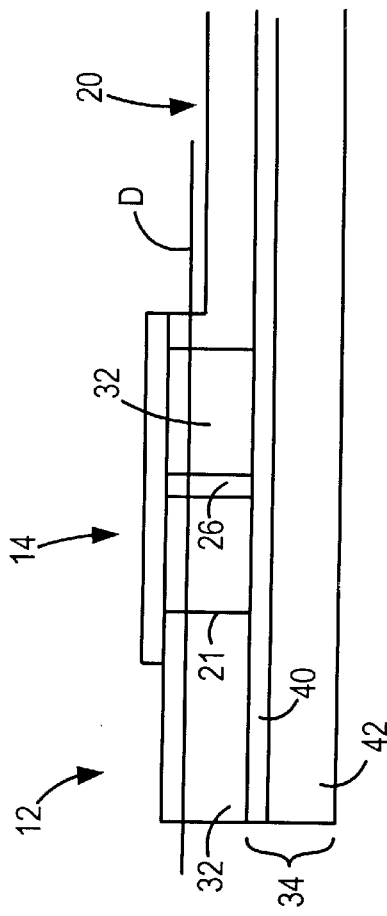
FIG. 3E is a cross section of the component in FIG. 3B taken at the line labeled C.
Figure 3F:
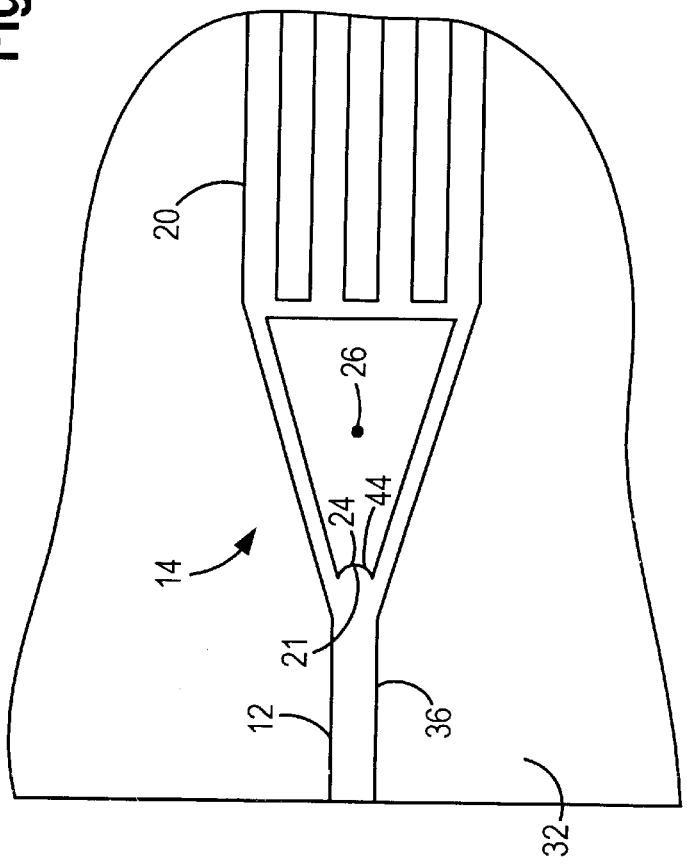
FIG. 3F is a cross section of the component in FIG. 3E taken at the line labeled D.

FIG. 3A is a perspective view of a portion of an optical component 30 having an input light distribution component 14 according to the present invention. FIG. 3B is a topview of the optical component 30 shown in FIG. 3A. FIG. 3C is a cross section of the component 30 in FIG. 3B taken at the line labeled A; FIG. 3D is a cross section of the component 30 in FIG. 3B taken at the line labeled B and FIG. 3E is a cross section of the component 30 in FIG. 3B taken at the line labeled C. FIG. 3F is a cross section of the component 30 in FIG. 3E taken at the line labeled D. The illustrated portion of the optical component 30 includes an input waveguide 12, an input light distribution component 14 and a plurality of array waveguides 20.

The component 30 includes a light transmitting medium 32 formed over a base 34. The light transmitting medium 32 includes a ridge 36 that defines a portion of a light signal carrying region 38. One embodiment of the base 34 includes a light barrier 40 positioned over a substrate 42. The light barrier 40 serves to reflect light signals from the light signal carrying region 38 back into the light signal carrying region 38. As a result, the light barrier 40 also defines a portion of the light signal carrying region 38. The line labeled E illustrates the profile of a light signal carried in the light signal carrying region 38 of FIG. 3C. The light signal carrying region 38 extends through the input waveguide 12, the input light distribution component 14, each the array waveguides 20, the output light distribution component 18 and each of the output waveguides 16.

Suitable light transmitting media include, but are not limited to, silicon, silica, polymers, SiN, SiC, $LiNbO_3$, GaAs and InP. Suitable substrates 42 include, but are not limited to, silicon, silica, polymers, $LiNbO_3$, GaAs and InP. Suitable light barriers 40 include material having reflective properties such as metals. Alternatively, the light barrier 40 can be a material with a different index of refraction than the light transmitting medium 32. The change in the index of refraction can cause the reflection of light from the light signal carrying region 38 back into the light signal carrying region 38. A suitable light barrier 40 would be silica when the light carrying medium and the substrate 42 are silicon. Another suitable light barrier 40 would be air or another gas when the light carrying medium is silica and the substrate 42 is silicon.

The light transmitting medium 32 in the input waveguides 12 and the array waveguides 20 is different than the light transmitting medium 32 in the input light distribution component 14. For instance, the light transmitting medium 32 in the input light distribution component 14 can be air or silica while the light transmitting medium 32 in the input waveguides 12 is silicon. When the light transmitting medium 32 of the input light distribution component 14 is air, a reflective material such as a metal can be positioned over the input light distribution component 14. The reflective material serves to reflect light signals from the input light distribution component 14 back into the input light distribution component 14.

The light transmitting medium 32 in the input waveguides 12 and the array waveguides 20 can have an index of refraction that is less than the index of refraction of the light transmitting medium 32 in the input light distribution component 14. The size of the input light distribution component 14 increases as the index of refraction of the input light distribution component 14 increases. As a result, reducing the index of refraction can provide a smaller input light distribution component 14 and accordingly, a small optical component 30.

The ridge 36 that defines the waveguides extends around the input light distribution component 14. The ridge 36 reduces the escape of light signals from within the input light distribution component 14. The ridge 36 around the input light distribution component 14 can be constructed from the same light transmitting medium 32 as the input waveguides 12 and the array waveguides 20.

An obstruction 26 is positioned in the input light distribution component 14. The obstruction 26 can be a post or column extending upward from the base 34. The obstruction 26 is constructed from a different material than the input light distribution component 14. Additionally, the obstruction 26 can be constructed from the same light transmitting medium 32 as the input waveguide 12 and the array waveguides 20.

The input waveguide 12 includes a curved facet 44 at the intersection of the input waveguide 12 and the input light distribution component 14. The curved facet 44 has a shape that substantially collimates the light signals traveling along the input waveguide 12. Accordingly, the curved facet 44 serves as a collimator 24. The curved facet 44 can be curved in two dimensions or in three dimensions. When the facet is curved in only two dimensions, a reduced level of collimation is achieved.

An anti-reflective coating can be formed on the facet of the input waveguide 12 and on the inlet ports of the array waveguides 20. The anti-reflective coating can reduce reflection and scattering at the intersection of the waveguides and the first light transmitting medium 32.

During operation of the input light distribution component 14, light signals in the input waveguide 12 are substantially collimated by the curved facet 44. A least a portion of the light signals are incident on the one or more obstructions 26. The interaction of the light signal with the one or more obstructions 26 gives the light signal a substantially sinc shaped intensity distribution. The light signal then enters the array waveguides 20.

Figure 4A:
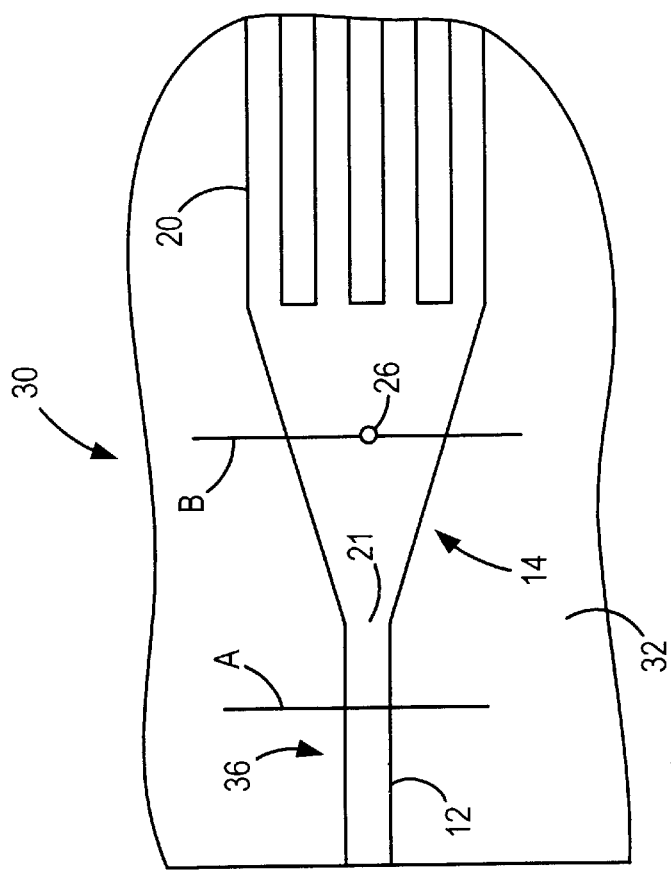
FIG. 4A is a topview of a portion of an optical component having another embodiment of an optical component according to the present invention.
Figure 4C:
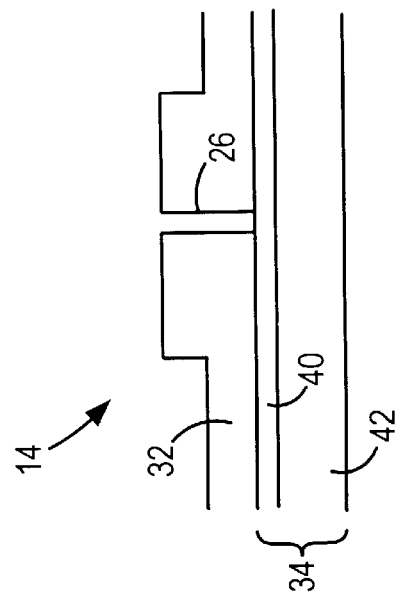
FIG. 4C is a cross section of the component in FIG. 4A taken at the line labeled B.
Figure 4B:
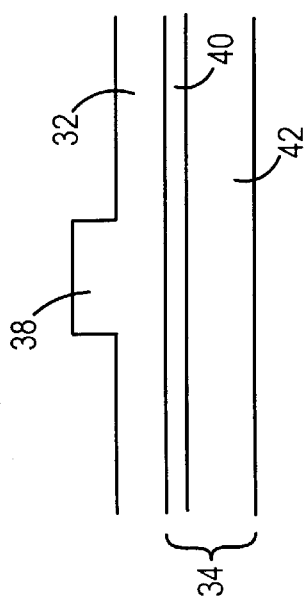
FIG. 4B is a cross section of the component in FIG. 4A taken at the line labeled A.

FIG. 4A through FIG. 4C illustrate a portion of another embodiment of an optical component 30 having an input light distribution component 14 according to the present invention. FIG. 4A is a topview of a portion of an optical component 30 having an input light distribution component 14 according to the present invention. FIG. 4B is a cross section of the component 30 in FIG. 4A taken at the line labeled A and FIG. 4C is a cross section of the component 30 in FIG. 4A taken at the line labeled B.

The light transmitting medium 32 used in the input light distribution component 14 is the same as the light transmitting medium 32 used in the input waveguide 12 and the array waveguides 20. The input waveguide 12 does not include an element for collimating the light signals from the input waveguide 12.

The input light distribution component 14 includes an opening that serves as the obstruction 26. The opening extends through the light transmitting medium 32 to the base 34. In some instances, the opening is filled with air. Accordingly, a column of air can serve as the obstruction 26. The opening can be generated by drilling a hole through the input light distribution component 14 with a component 30 such as a laser or by etching a hole into the input light distribution component 14.

FIG. 5A through FIG. 5C illustrates a output light distribution component 18 that is suitable for use with the input light distribution component 14 of FIG. 3A through FIG. 3F or FIG. 4A through FIG. 4C. FIG. 5A is a topview of a portion of an optical component 30 having a output light distribution component 18 according to the present invention. FIG. 5B is a cross section of the component 30 in FIG. 5A taken at the line labeled A and FIG. 5C is a cross section of the component 30 in FIG. 5A taken at the line labeled B.

The output light distribution component 18 includes a plurality of array waveguides 20, a output light distribution component 18 and a plurality of output waveguides 16. Each of the array waveguides 20 can be connected to an array waveguide 20 of an input light distribution component 14 constructed according to FIG. 3A through FIG. 3F or FIG. 4A through FIG. 4C. The output light distribution component 18 can include the same light transmitting medium 32 as the input waveguide 12 or the array waveguides 20. Suitable shapes for the output light distribution component 18 include, but are not limited to, a star coupler and a Rowland circle.

Figure 6B:
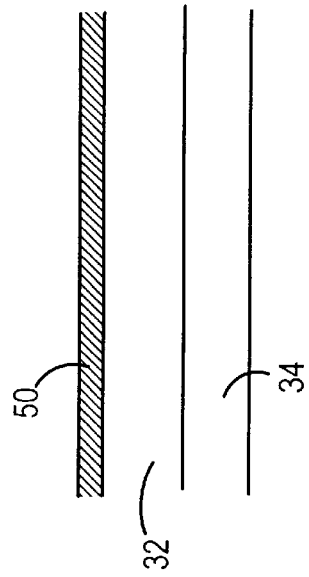
FIG. 6A through FIG. 6H illustrate a method of fabricating an optical component according to the present invention.
Figure 6D:
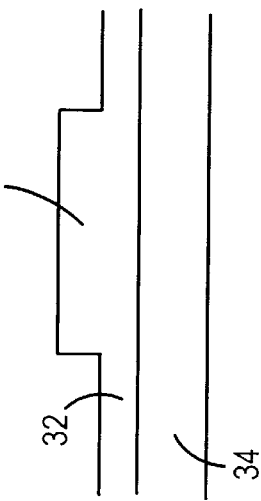
Figure 6A:
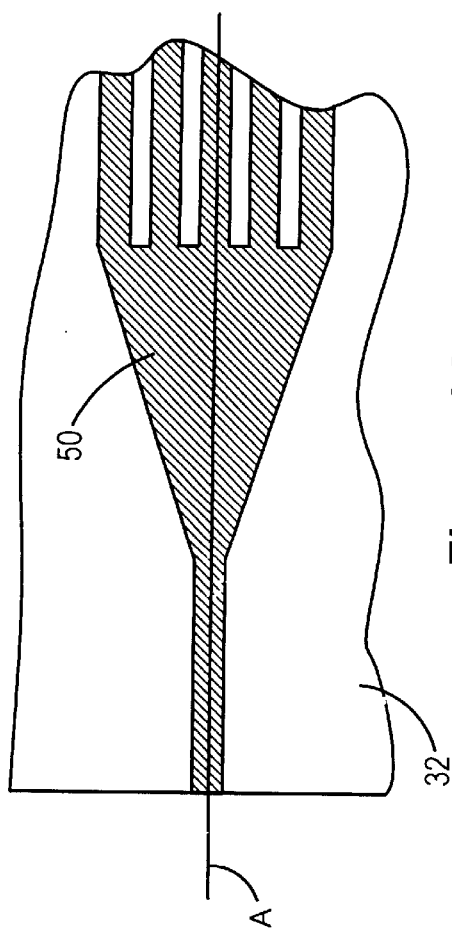

FIG. 6A through FIG. 6H illustrate a method of fabricating an optical component 10 according to the present invention. FIG. 6A is a topview of the optical component 30 and FIG. 6B is a cross section of the optical component 30 taken at the line labeled A. The portion of the component 30 that is illustrated is the region where the input light distribution component 14 will be formed. A mask 50 is formed over the portions of the component 30 where the input waveguide 12, the input light distribution component 14, the array waveguides 20, the output light distribution component 18 and the output waveguides 16 are to be formed.

Figure 6C:
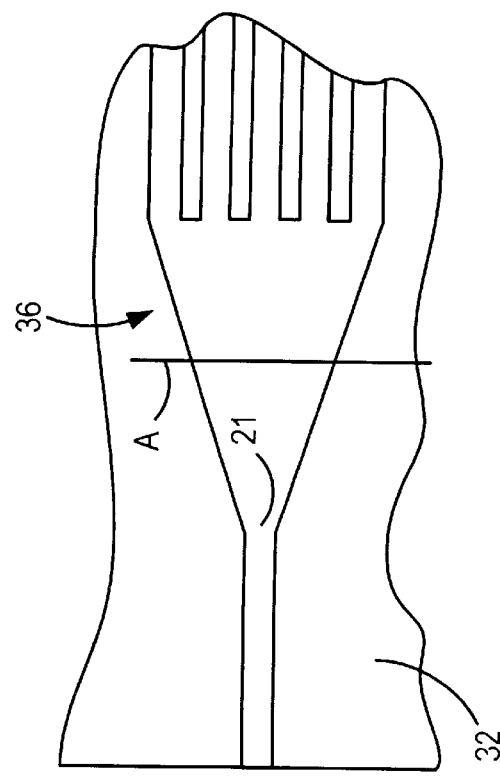

An etch is performed and the mask 50 removed to provide the optical component 30 shown in FIG. 6C and FIG. 6D. FIG. 6C is a topview of the optical component 30 and FIG. 6D is a cross section of the optical component 30 taken at the line labeled A. The dashed line illustrates the location of the base of the ridge 36 in FIG. 6D. The etch results in formation of the sides of the ridge 36 associated with the input waveguides 12 and the input light distribution components 14. These sides preferably have a high level of smoothness. Suitable etches include, but are not limited to, reactive ion etches, etches in accordance with the Bosch process and an etch according to U.S. patent application Ser. No. 09/690,959, filed on Oct. 16, 2000, entitle "Formation of a Vertical Smooth Surface on an Optical Component" and incorporated herein in its entirety. At this point, fabrication of the output light distribution component 18 is complete. Accordingly, the output light distribution component 18 can be masked during subsequent etches.

Figure 6F:
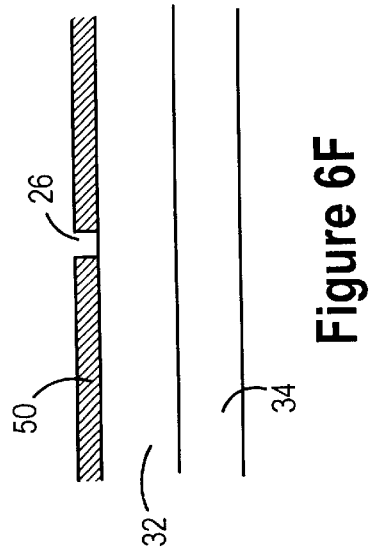
Figure 6H:
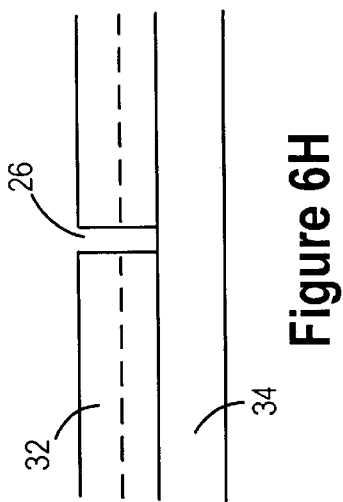
Figure 6E:
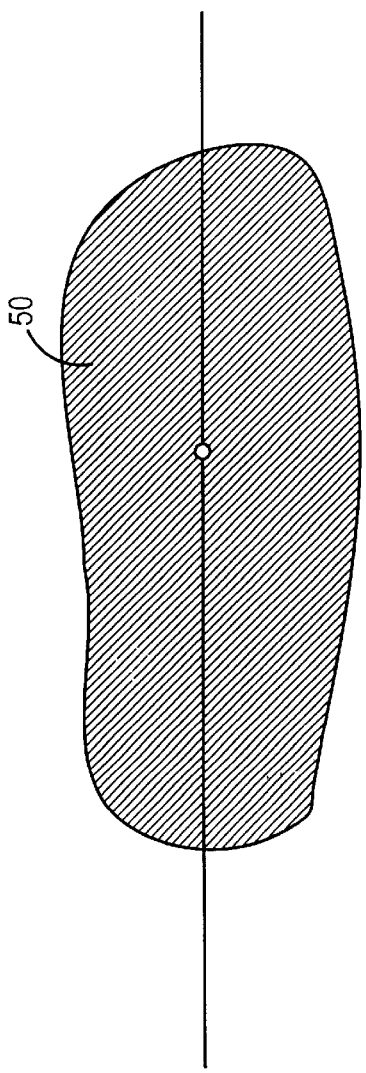

A mask 50 is formed on the component 30 so as to provide the component 30 illustrated in FIG. 6E and FIG. 6F. FIG. 6E is a topview of the optical component 30 and FIG. 6F is a cross section of the optical component 30 taken at the line labeled A. The mask 50 is formed so the region where the one or more obstructions 26 are to be formed remains exposed.

Figure 6G:
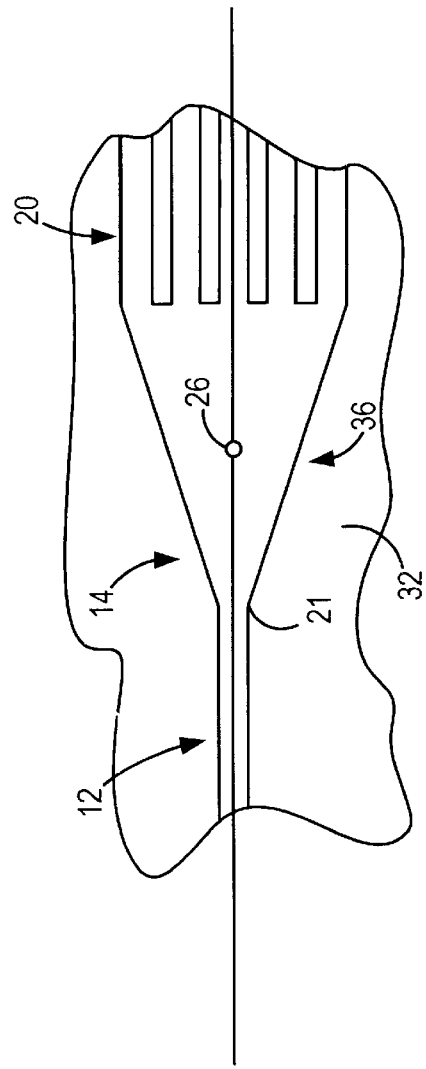

A second etch is performed and the mask 50 removed to provide the component 30 illustrated in FIG. 6G and FIG. 6H. FIG. 6G is a topview of the optical component 30 and FIG. 6H is a cross section of the optical component 30 taken at the line labeled A. The second etch is performed at least to the base 34. The component 30 illustrated in FIG. 6G through FIG. 6H is the optical component 30 illustrated in FIG. 4A through FIG. 4C.

Figure 7B:
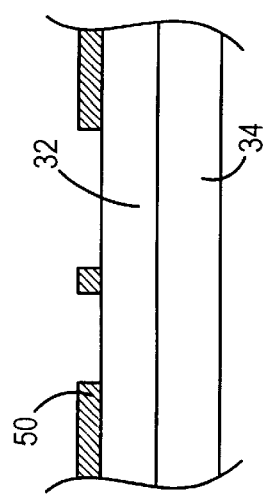
FIG. 7A through FIG. 7F illustrate another embodiment of a method of fabricating an optical component according to the present invention.
Figure 7D:
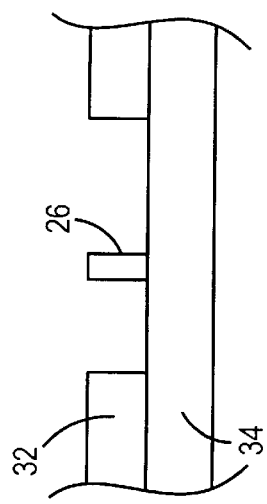
Figure 7A:
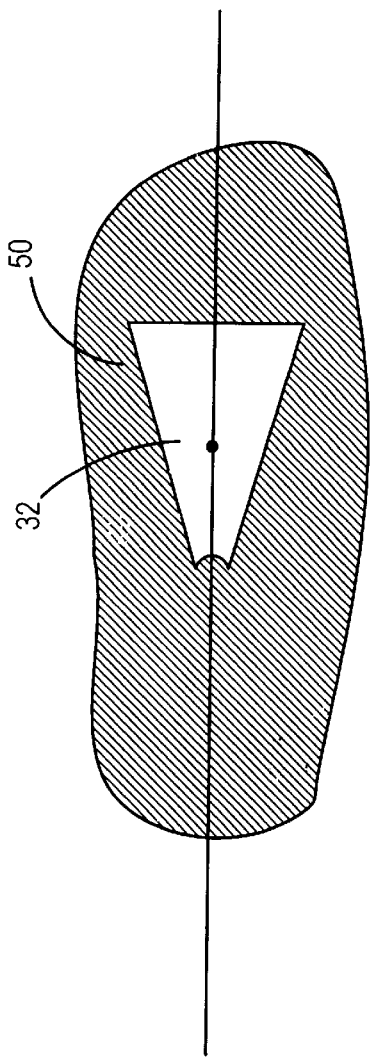

FIG. 7A through FIG. 7F illustrate another method of forming an optical component 30 according to the present invention. The method can be initiated using the component 30 illustrated in FIG. 6C and FIG. 6D. As illustrated in FIG. 7A and FIG. 7B, a mask 50 is formed over the component 30 such that a portion of the input light distribution component 14 located within the ridge 36 remains exposed. Additionally, the mask 50 is formed over the region where the obstruction 26 is to be formed. The portion of the mask 50 over the facet of the input waveguide 12 is provided with a curved shape in order to provide a curved waveguide facet.

Figure 7C:
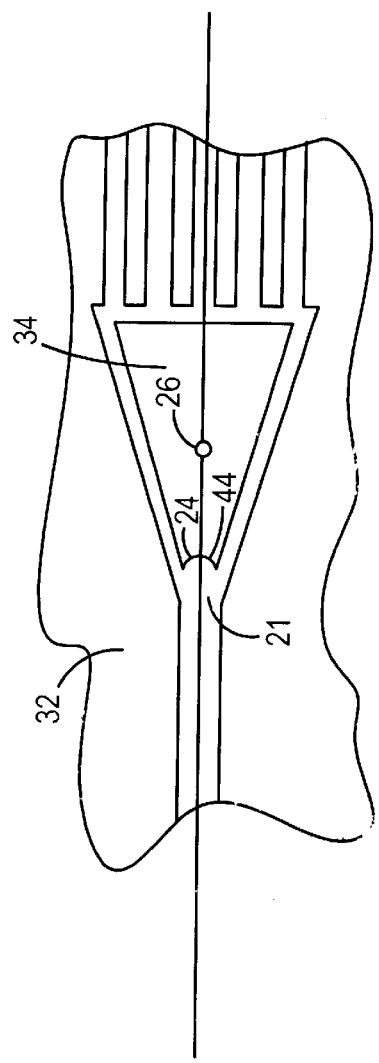

A second etch is performed and the mask 50 removed to provide the component 30 illustrated in FIG. 7C and FIG. 7D. FIG. 7C is a topview of the optical component 30 and FIG. 7D is a cross section of the optical component 30 taken at the line labeled A. The second etch can be performed all the way down to the base 34 and can extend part way into the base 34. This etch results in formation of the curved waveguide facet. As a result, this etch preferably provides a high level of smoothness. Suitable etches include, but are not limited to, reactive ion etches, etches in accordance with the Bosch process and an etch according to U.S. patent application Ser. No. 09/690,959, filed on Oct. 16, 2000, entitled "Formation of a Vertical Smooth Surface on an Optical Component" and incorporated herein in its entirety.

A layer of a reflective material such as a metal can optionally be deposited in the bottom of the input light distribution component 14 before the mask 50 is removed. The layer of reflective material can reduce optical losses through the bottom of the input light distribution component 14. Additionally, layers of antireflective materials can be formed on the facet of the input waveguide 12 and the entry ports of the array waveguides 20 before the mask 50 is removed.

Figure 7F:
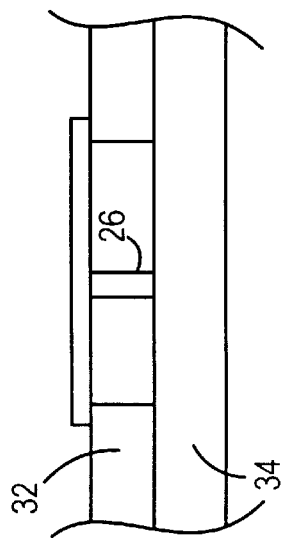
Figure 7E:
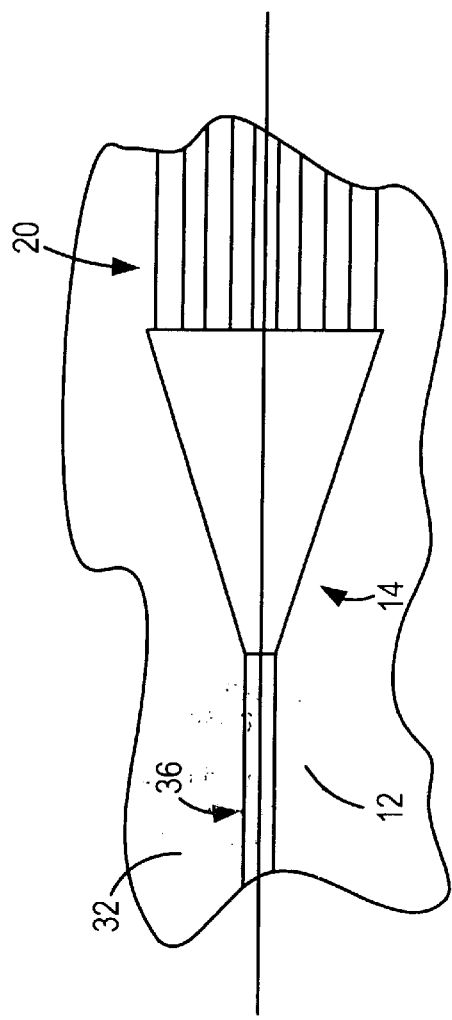

A reflective material such as a reflective layer can be positioned over the input light distribution component 14 to provide the optical component 30 shown in FIG. 7E and FIG. 7F. The reflective layer can be attached using metal bonding techniques or can be attached with a bonding material such as an epoxy. The component 30 illustrated in FIG. 7E and FIG. 7F is the component 30 shown in FIG. 3A through FIG. 3F.

Although FIG. 3A through FIG. 7F illustrate the output side of the input light distribution component as having a straight contour, the output side of the input light distribution component can have a curved contour as discussed with respect to FIG. 2C. Additionally, one or more additional layers of material can be formed over the light transmitting medium illustrated in FIG. 3A through FIG. 7F.

Although the above invention is described in the context of a demultiplexer, the invention can be employed with other optical components. For instance, the array waveguide grating can be configured such that the optical component functions as a tunable filter as taught in U.S. patent application Ser. No. 09/845,685; filed on Apr. 30, 2001; and entitled "Optical Filter" or as a dispersion compensator as taught in U.S. patent application Ser. No. 09/866,491; filed on May 25, 2001; and entitled "Dispersion Compensator" and in U.S. patent application Ser. No. 09/872,473; filed on Jun. 1, 2001; and entitled "Tunable Dispersion Compensator." When the optical component is configured to operate as a filter or a dispersion compensator, the optical component can optionally be configured to have a demultiplexing function in addition to filter and/or dispersion compensating function(s).

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. An optical component, comprising:
   a light distribution component defined in a light transmitting medium positioned on a base and being configured to receive a light signal through an inlet port and to distribute the light signal across an output side, the light distribution component being configured such that a light signal received through the inlet port with a non-periodic intensity distribution is distributed across the output side with a periodic intensity distribution; and
   a plurality of array waveguides configured to receive the light signal distributed across the output side of the light distribution component.

2. The component of claim 1, further comprising:
   an input waveguide connected to the inlet port.

3. The component of claim 1, wherein a light signal carrying region for carrying the light signal extends through the light distribution component and one or more obstructions are positioned in the light signal carrying region, the one or more obstructions configured to obstruct a portion of the light signal traveling through the light signal carrying region.

4. The component of claims 3, wherein the one or more obstructions includes one or more columns extending through the light signal carrying region.

5. The component of claim 3, wherein the one or more obstructions define an opening through which the light signal can travel.

6. The component of claim 3, wherein the light distribution component is defined in a light transmitting medium positioned over a base and the one or more obstructions extends through the light transmitting medium.

7. The component of claim 3, wherein the one or more obstructions includes a column of air.

8. The component of claim 3, wherein the one or more obstructions each have a width that is smaller than the width of the light signal at a point where the light signal intersects the obstruction.

9. The component of claim 1, further comprising:
   a collimator for collimating the light signal.

10. The component of claim 9, wherein one or more obstructions is positioned between the collimator and the inlet port.

11. The component of claim 9, wherein the collimator is included in an input waveguide that ends at the inlet port.

12. The component of claim 9, wherein the collimator is a curved facet positioned at an end of an input waveguide that ends at the inlet port.

13. The component of claim 1, further comprising:
   an input waveguide connected to the light distribution component such that a light signal carrying region for carrying the light signal extends through the input waveguide and the light distribution component, the light signal carrying region extending through the input waveguide being constructed from a different material than the light signal carrying region extending through the light distribution component.

14. The component of claim 13, wherein the light signal carrying region extending through the input waveguide is constructed from a material with a higher index of refraction than the light signal carrying region extending through the light distribution component.

15. The component of claim 1, wherein the periodic intensity distribution has a shape that approximates a sinc function.

16. The component of claim 1, wherein at least 3 array waveguides receive the portion of the light signal associated with one or more periods of the sinc function.

17. The component of claim 1, wherein the output side is straight.

18. The component of claim 1, wherein the output side is a semi circle.

19. An optical component, comprising:
   an array waveguide grating having a plurality of array waveguides;
   an input light distribution component configured to receive a light signal through an inlet port and distribute the light signal to a plurality of the array waveguides; and
   an output light distribution component configured to receive the light signal distributed to the array waveguides and focus the received light signal on one or more output waveguides, the input light distribution component configured such that a light signal received through the inlet port with a non-periodic intensity distribution is received in the output light distribution component with a periodic intensity distribution.

20. The component of claim 19, wherein the input light distribution component includes a light signal carrying region for carrying the light signal through the input light distribution component and one or more obstructions are positioned in the light signal carrying region, the one or more obstructions configured to obstruct a portion of the light signal traveling through the light signal carrying region.

21. The component of claim 19, wherein the one or more obstructions define an opening through which the light signal can travel.

22. The component of claim 19, wherein the periodic intensity distribution has a shape that approximates a sinc function.

23. The component of claim 19, wherein the array waveguide grating is configured such that the component operates as a demultiplexer.

24. The component of claim 19, wherein the input light distribution component is formed in a light transmitting medium positioned on a base.

* * * * *